April 16, 1929.   H. E. S. HOLT   1,709,264
APPARATUS FOR LOWERING MAIL BAGS AND OTHER LOADS FROM AIRCRAFT
Filed Oct. 14, 1926   7 Sheets-Sheet 1

Inventor
Harold E. S. Holt,
H. B. Willson & Co
Attorneys

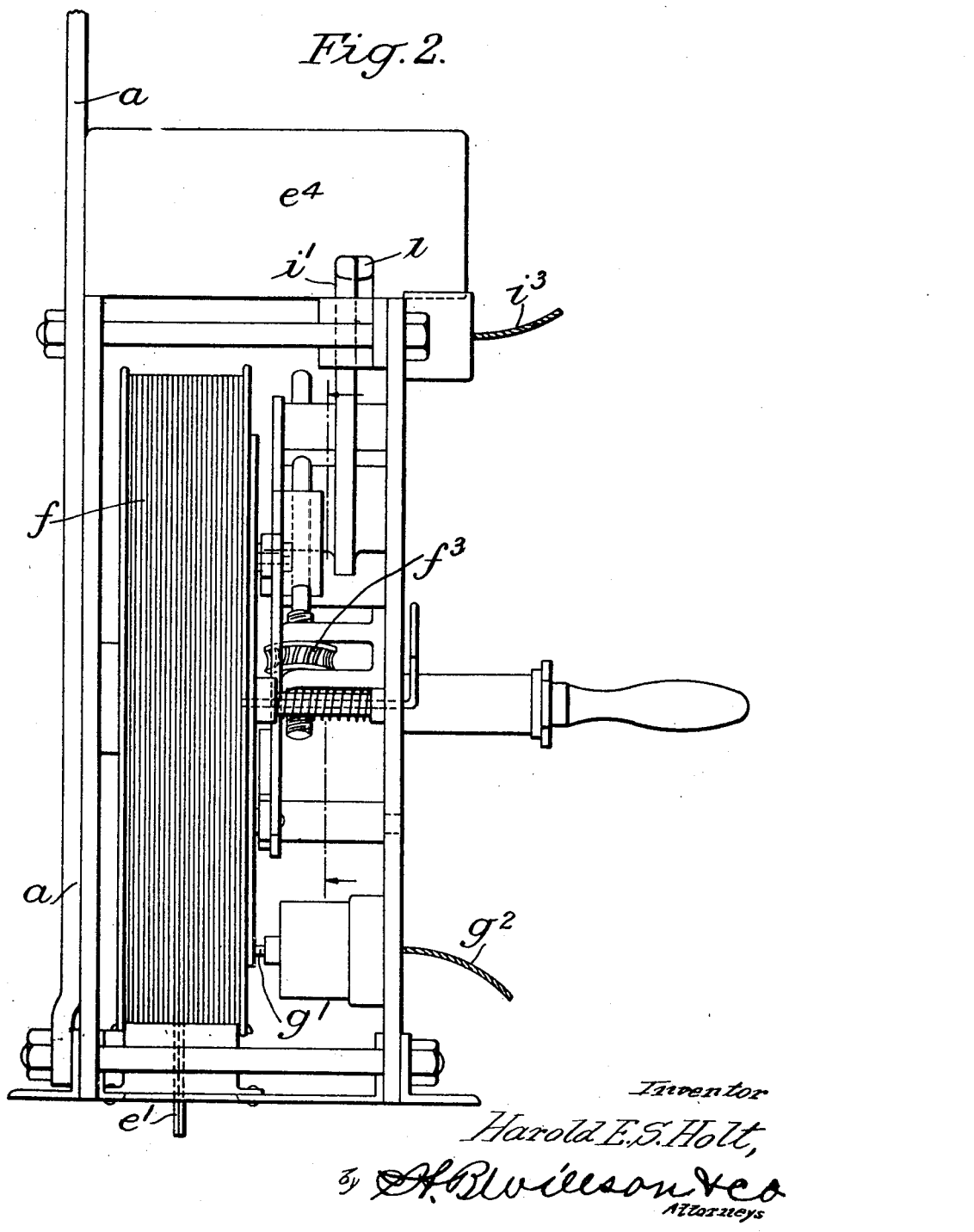

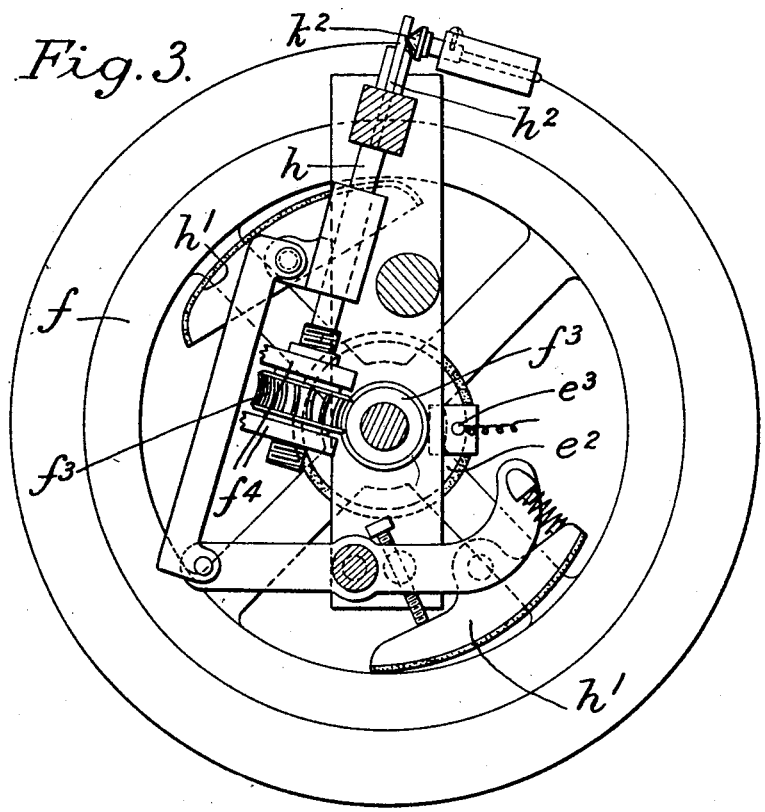
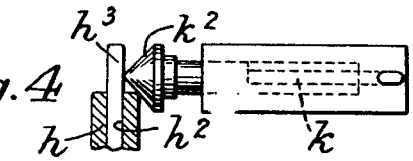
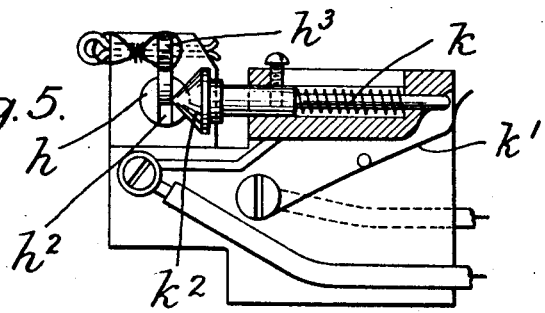

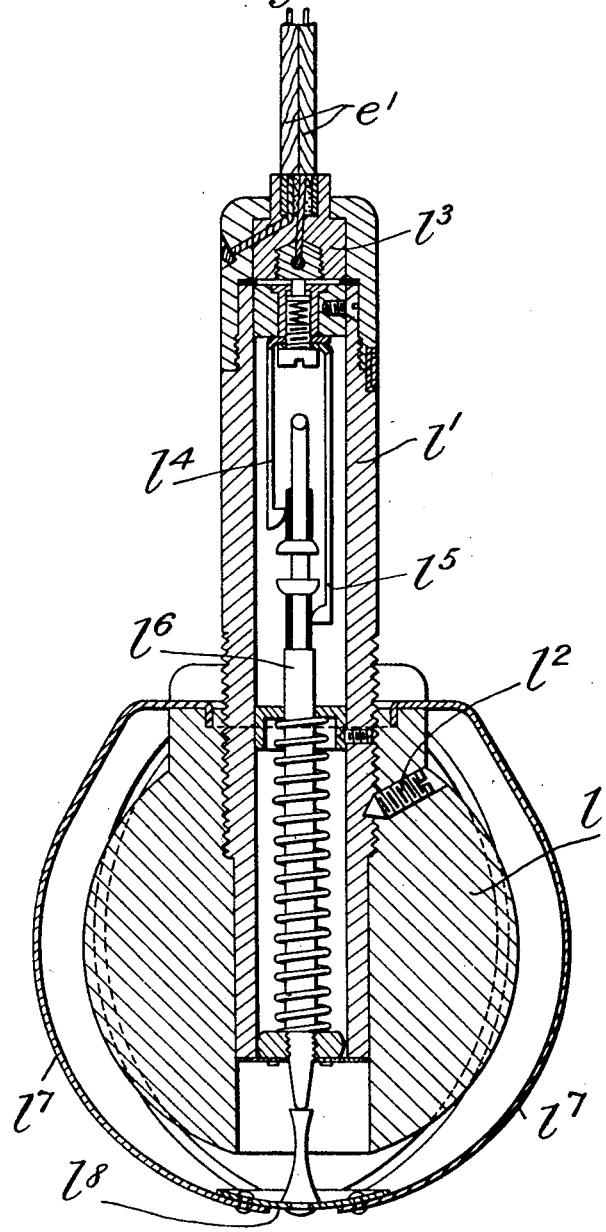

April 16, 1929.  H. E. S. HOLT  1,709,264
APPARATUS FOR LOWERING MAIL BAGS AND OTHER LOADS FROM AIRCRAFT
Filed Oct. 14, 1926   7 Sheets-Sheet 5
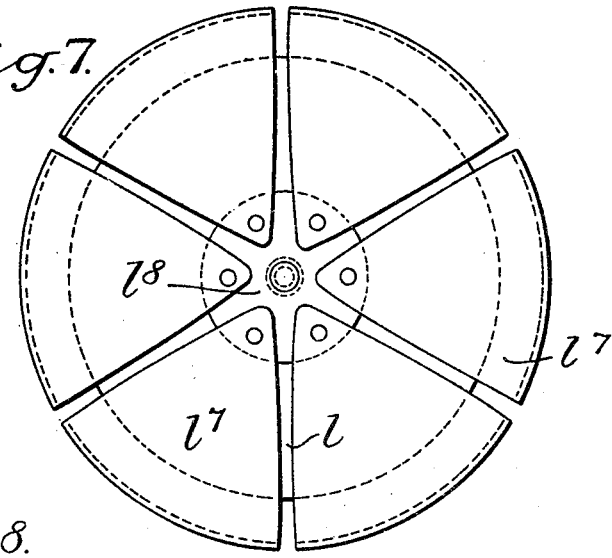
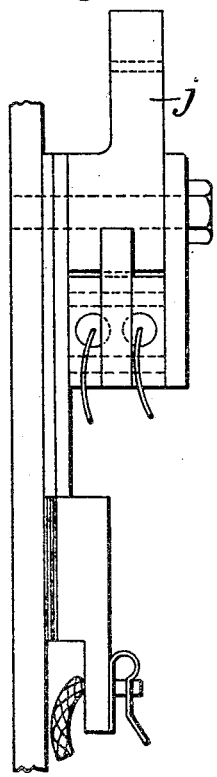
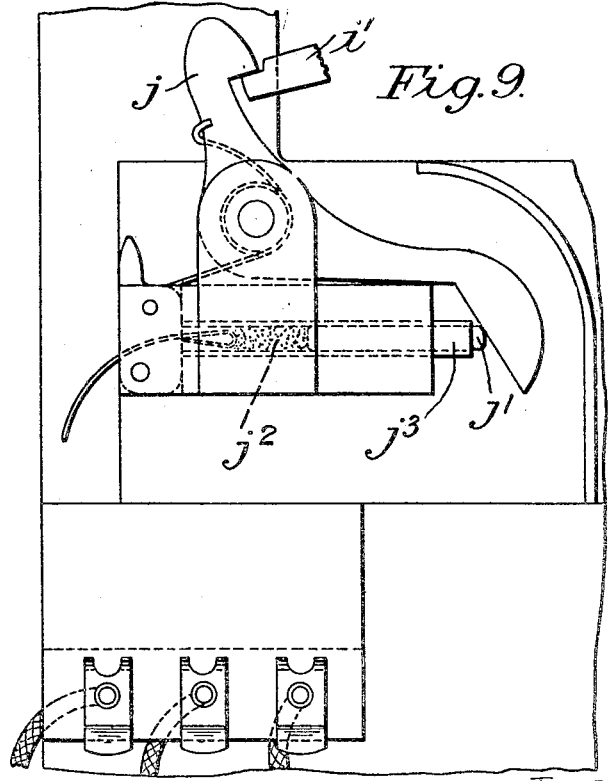
Inventor
Harold E. S. Holt,
by H. B. Willson & Co.
Attorneys April 16, 1929.  H. E. S. HOLT  1,709,264
APPARATUS FOR LOWERING MAIL BAGS AND OTHER LOADS FROM AIRCRAFT
Filed Oct. 14, 1926   7 Sheets-Sheet 6
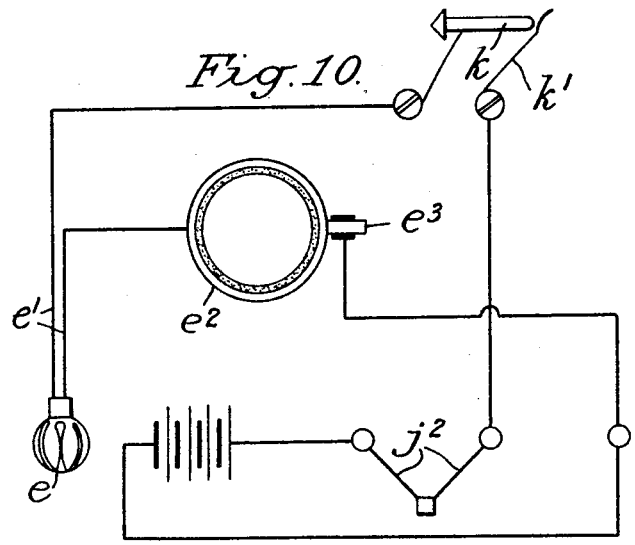
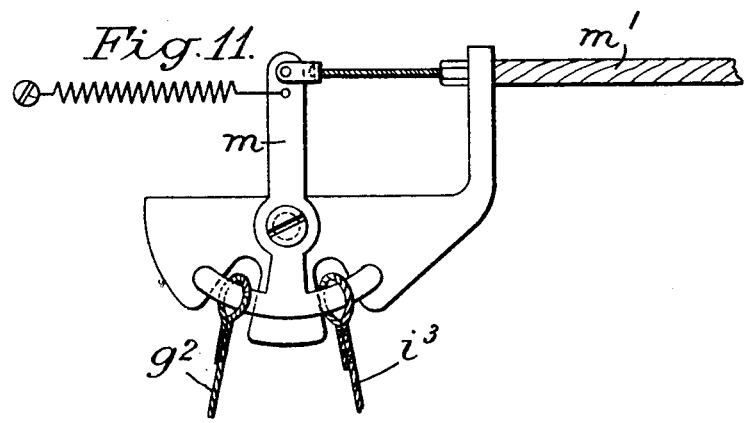
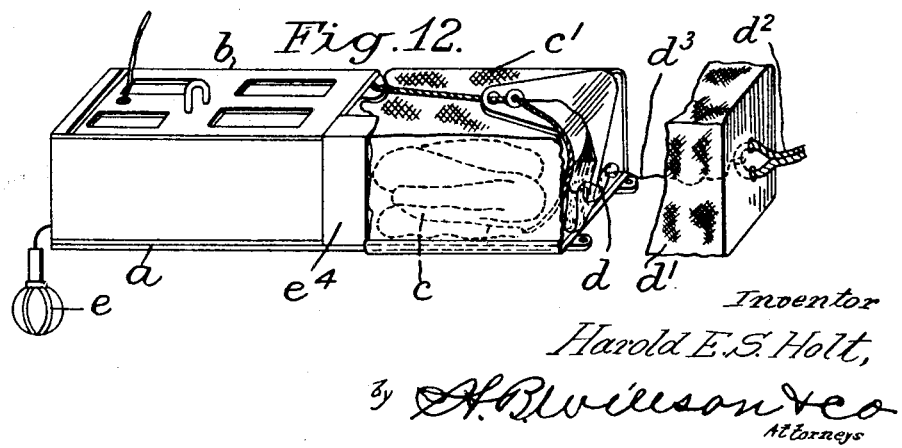
Inventor
Harold E. S. Holt,
By H. B. Willson & Co
Attorneys April 16, 1929.  H. E. S. HOLT  1,709,264
APPARATUS FOR LOWERING MAIL BAGS AND OTHER LOADS FROM AIRCRAFT
Filed Oct. 14, 1926  7 Sheets-Sheet 7
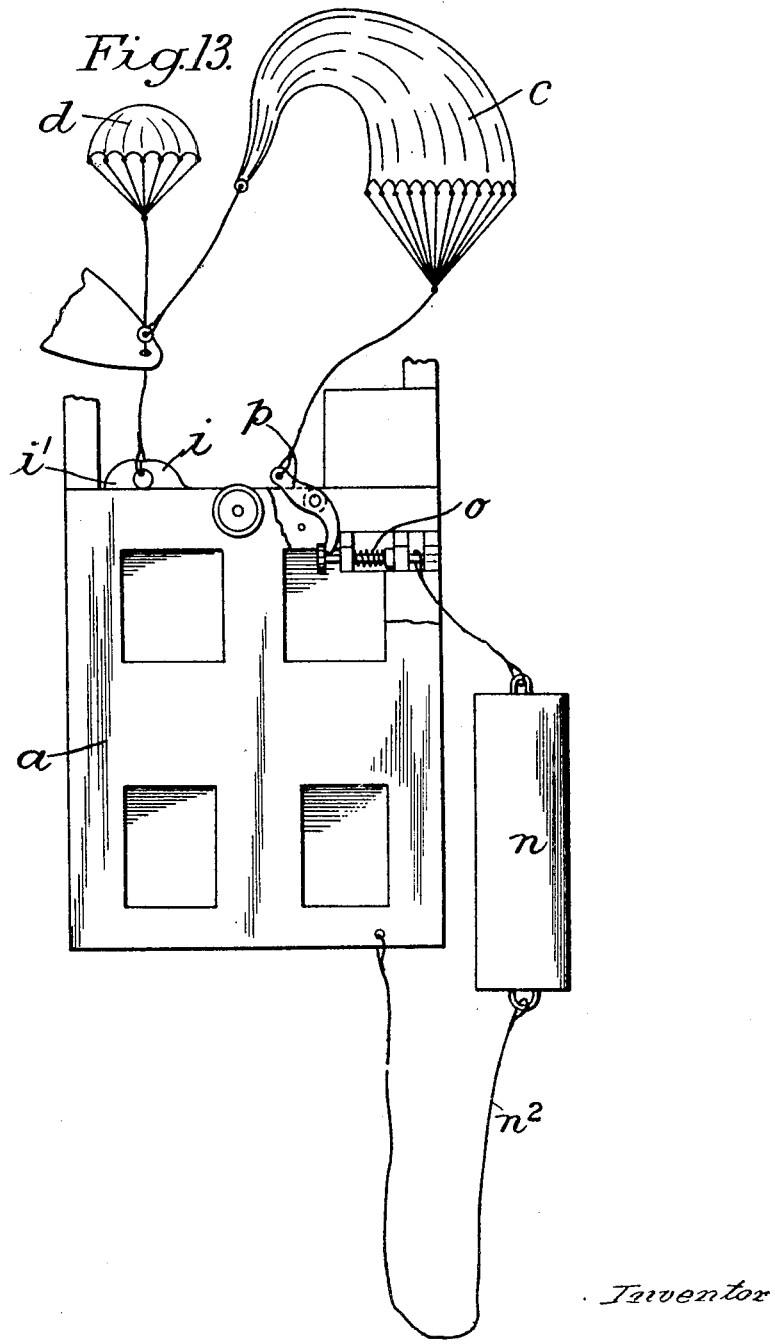
Inventor
Harold E. S. Holt,
by H. B. Willson & Co
Attorneys Patented Apr. 16, 1929.

1,709,264

UNITED STATES PATENT OFFICE.

HAROLD EDWARD SHERWIN HOLT, OF LONDON, ENGLAND.

APPARATUS FOR LOWERING MAIL BAGS AND OTHER LOADS FROM AIRCRAFT.

Application filed October 14, 1926, Serial No. 141,638, and in Great Britain November 7, 1925.

This invention relates to apparatus for lowering mail bags and other loads from aircraft in which the rate of descent of the load is controlled by main and pilot parachute, means being provided under the control of a pilot weight whereby the main parachute can be kept inoperative until it reaches approximately a given distance from the ground which is determined by the length of a rope, line or cable to which the pilot weight is attached. More especially the invention refers to such apparatus of the kind described in my prior British specification No. 168,924, wherein a pilot weight provided with circuit closing means adapted to be operated by impact is suspended from a line or cable which when the apparatus is launched is unwound from a rotary drum, and wherein automatically actuated braking means are provided to arrest the rotation of the drum when the line or cable has unwound sufficiently from the drum.

According to the present invention the rotation of the drum from which the line is unwound is arranged through the medium of worm reduction gearing and screw and nut mechanism to effect a gradual application of brake shoes to the drum so as to minimize the resultant shock and obviate damage to the line or cable. This brake operating mechanism is also arranged to close, as the pilot weight falls, a switch in the electric circuit which effects the opening of the main parachute when the weight strikes the ground or other object. A further feature of this invention resides in the means for restraining the main parachute against release, said means comprising a pair of coupling jaws holding between them the suspending cable of the pilot parachute one of said jaws being capable of release by the electrical control means whilst the other is held by a pin which may be withdrawn by a static cord upon the apparatus being launched from a low altitude to bring the main parachute into operation immediately. Prior to the launching of the apparatus the drum with its line wound thereon is locked against movement by a pin which can be withdrawn by a static cord connected with the air-craft when the main parachute is to be released by the electric control mechanism at a given height from the ground. A two way coupling device may be provided for releasing either one and retaining the other of the two static cords as the apparatus is launched.

The pilot weight is equipped with electric contact mechanism preferably comprising a single circuit closing plunger, whereby an electric circuit is closed through the action of displaceable or frangible members on the weight operated by impact with the ground or by striking any object on the ground such as a tree for example. The electric circuit, which runs through the weight-suspending cable, is supplied with current from a battery in the parachute apparatus which ignites a small explosive charge and fires a projectile against or otherwise operates a release mechanism whereby the main parachute is permitted to open and control the further descent of the load.

The invention is hereinafter more fully described with reference to the accompanying drawings wherein:—

Figures 1 and 2 show in front and side elevations respectively the parachute control mechanism with the casing removed.

Figure 3 is a detail elevation showing the drum and brake mechanism.

Figures 4 and 5 are respectively elevation and plan of a safety switch preventing premature operation of the electric control apparatus.

Figures 6 and 7 show in sectional elevation and plan respectively the pilot weight with its circuit closing means.

Figures 8 and 9 illustrate in side elevation and under plan the electrically controlled catch lever.

Figure 10 illustrates diagrammatically the electric connections throughout the apparatus.

Figure 11 illustrates a two way coupling device for the static cords controlling the operation of the apparatus.

Figure 12 is a perspective view on a smaller scale of the complete apparatus in the position it occupies when carried beneath the air-craft.

Figure 13 is a diagrammatic view showing the two parachutes released and the manner in which the load is attached.

Figure 1:
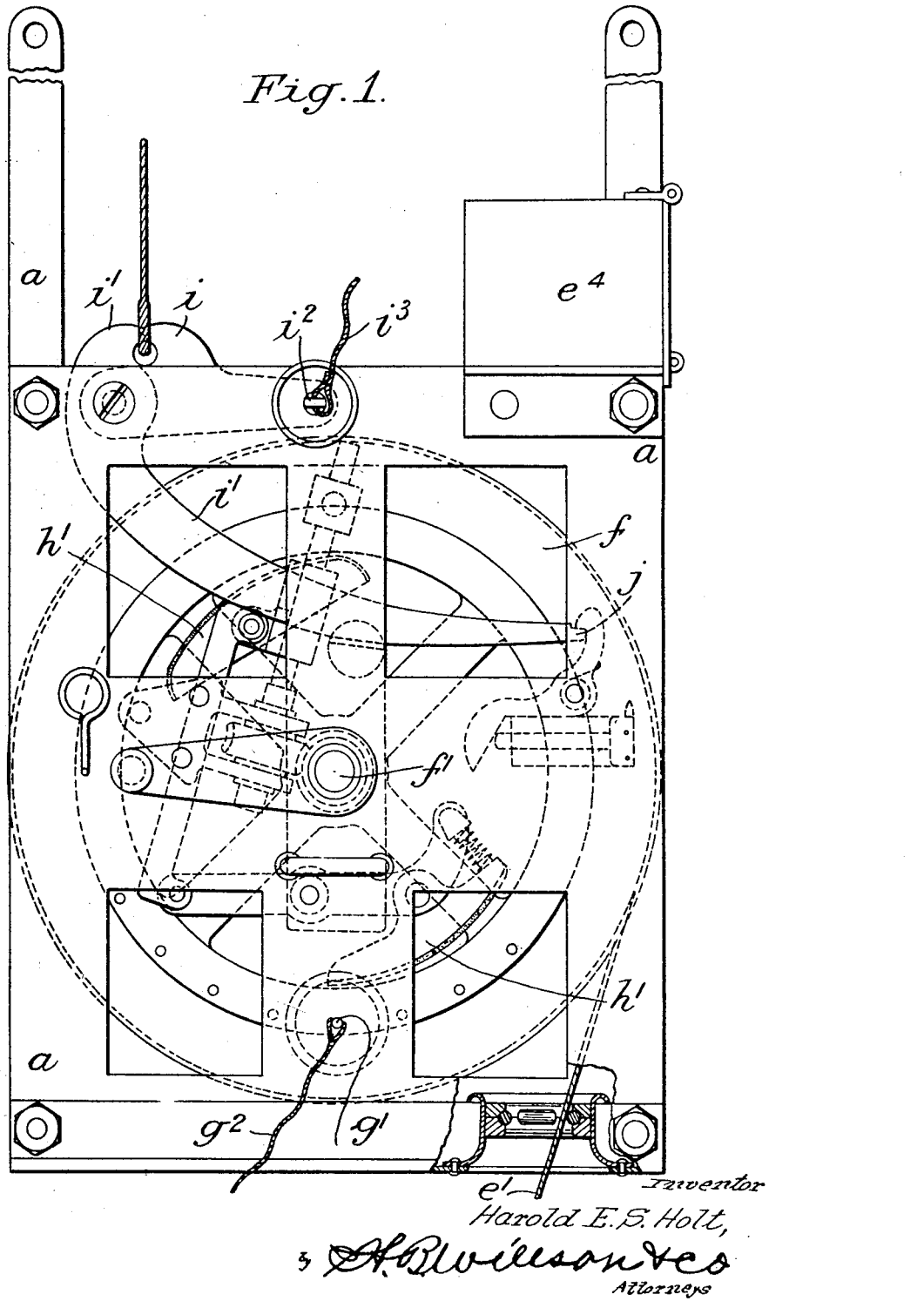

In the preferred arrangement shown the apparatus comprises a frame $a$ carrying at one end the control mechanism housed in a casing $b$ and at the other end the main parachute $c$ enclosed in a container $c'$ and the pilot parachute $d$ which is normally housed in a cover $d'$ slipped over the end of the container $c'$. The cover $d'$ is withdrawn from the parachute container as the latter is launched by a strong line or rope $d^2$ connected with the air-craft and a light breakable cord $d^3$ extending from the cover to the pilot parachute withdraws the latter for action and then breaks. The load now falls with the pilot parachute exerting a slight restraining action and tending to release the main parachute but prevented from effecting this latter operation by the control mechanism until the pilot weight strikes the ground or some other object.

The pilot weight $e$ is attached to a line $e'$ normally wound upon a rotary drum $f$ which prior to the launching of the apparatus is locked against movement by a safety pin $g$ engaging aligned holes in the framework and the periphery of the drum and further by a pin $g'$ attached by a static cord $g^2$ to the aircraft. The pin $g$ is first withdrawn by hand and the pin $g'$ is adapted to be withdrawn automatically by the static cord on launching being effected, to render the drum $f$ free to rotate under the influence of the pilot weight $e$.

The winding drum $f$ carrying the line $e'$ and pilot weight $e$ is carried on a shaft $f'$ which rotates with the drum in bearings in the frame $a$. On the shaft $f'$ of the drum is a worm $f^2$ which gears with a worm wheel $f^3$ supported in a bracket $f^4$ on the frame and held against endwise movement. The worm wheel $f^3$ forms part of a nut working on a threaded rod $h$ which is mounted to slide longitudinally, and is operatively connected with internal brake shoes $h'$ in the drum, the endwise movement of the rod $h$ being utilized to actuate the brake shoes which are pivoted on arms and with the aid of springs may be arranged to apply the pressure gradually and so arrest the running of the line $e'$ without undue shock. The threaded rod $h$ is formed with a key-way $h^2$ for the engagement of the key $h^3$ to prevent rotation of the spindle, but can be released by arranging the key $h^3$ to turn about a pivot, in order that if necessary the threaded rod $h$ can be rotated directly by a hand key applied to its end when it is desired to take the brakes off and rewind the line upon the drum $f$.

As previously mentioned when the apparatus is launched from high altitudes the main parachute $c$ is retained in folded condition in its container $c'$ and is not withdrawn or allowed to operate until the pilot weight $e$ reaches the ground, but the pilot parachute $d$ is pulled out by the breakable cord $d^3$ and becomes operative at the time of launching the apparatus and during the descent is connected with the main parachute and with the frame. Previous to the opening of the main parachute $c$ the pilot parachute $d$ is coupled to the frame by a coupling consisting of a pair of opposed jaws formed on two levers $i$ and $i'$ pivoted on the frame between which an eye or loop on the suspending cable of the parachute is retained (see Figures 1 and 12). The lever $i$ is held in the coupling position by a withdrawable pin $i^2$ and the other lever $i'$ is held by a spring influenced catch lever $j$, (see Figures 8 and 9) engaging a long arm on the lever. If the coupling be released by movement of either of the jaws the pull of the pilot parachute will be transferred from the coupling to the main parachute so that the main parachute will be pulled out of its housing and will become operative. One way of releasing the coupling as aforesaid is to move the catch lever $j$ out of engagement with the coupling lever $i'$ which it holds and this is conveniently effected by the impact of a small projectile $j'$ driven against the catch lever $j$ by the electric ignition of an explosive charge contained in a cartridge $j^2$ which is carried in a small tube $j^3$ adjacent to the lever and ignited electrically.

The electric ignition circuit is closed as hereinbefore described by displaceable members on the pilot weight when the latter reaches the ground. As the said circuit is formed in part by the suspending line of the pilot weight it will be understood that such line comprises separate insulated conductors which although wound on the drum must maintain electrical connection with the battery on the frame. For this purpose one of the conductors is connected with an insulated contact ring $e^2$, on the drum $f$ over which an insulated contact brush or strip $e^3$ in the circuit slides as the drum rotates and maintains contact (see Figures 3 and 10) whilst the other conductor has a frame or ground connection with the battery which is located in a locker $e^4$ (see Figure 1).

Premature closing of the electric circuit is prevented by including therein a normally open switch (see Figures 3 to 5, and 10) comprising a spring pressed plunger $k$ and an insulated contact strip $k'$ the plunger having a conical head $k^2$ which projects into the path of the brake operating rod $h$ and is actuated thereby to close the switch after a predetermined interval from the moment of launching the apparatus.

As shown in Figures 6 and 7 the pilot weight comprises a body $l$ of gun-metal or other suitable material screwed on and secured by a set screw $l^2$ to a tubular metal stem $l'$ to which the suspending line $e'$ containing the two conductors is attached by an insulating cap $l^3$. One conductor is connected with an insulated support carrying a pair of contact tongues $l^4$ and $l^5$ within the tubular stem, whilst the other conductor is connected through the stem itself with a spring loaded contact plunger or rod $l^6$ which is capable of being moved in one direction axially of the weight by direct or indirect impact and in the opposite direction by its spring to bring about the closing of the circuit.

In order that electrical contact may be effected under all conditions of landing on the ground, the pilot weight is enclosed in a spherical casing formed of metal segments $l^7$ connected at the base to a common plate $l^8$ carrying a stud $l^9$ which supports the plunger $l^6$ in a neutral position and so arranged that a displacement will occur which will bring about the operation of the spring contact plunger irrespective of the position in which the casing is struck. When a frangible member is employed the spring contact plunger operates upon the breaking of same.

When flying at low altitudes the pilot weight control mechanism for the main parachute may be rendered ineffective and the main parachute brought into action at the time of launching the apparatus by leaving the drum locking pin $g'$ in position and withdrawing the pin $i^2$ controlling the release of the coupling of the main parachute by a static cord $i^3$.

This is conveniently effected by the provision of an inverted T-shaped coupling member $m$ (see Figure 11), pivoted on the aircraft and connected by Bowden wire $m'$ or other means with a hand lever not shown so that by actuating the lever the coupling device may be made to release either of two static cords connected with the aforesaid controlling pins, whilst holding the other cord.

During the greater part of the descent the load $n$ (Figure 13) is held close up to the frame $a$ by a short rope $n'$ engaged with a spring bolt, $o$ but provision may be made for allowing the load $n$ to fall a short distance below the frame $a$ as allowed by the length of a second suspension rope $n^2$, so that such load may come to earth slightly in advance of the frame, thus lessening the shock on the mechanism. For this purpose the spring bolt $o$ normally holding the load is arranged to be released from the short cord $n'$ by the pull of the main parachute acting through a lever $p$, thus allowing the load to fall and hang below the frame a distance corresponding to the length of the suspension rope $n^2$. In cases where the load includes delicate articles likely to sustain damage under shock such portion of the load may be carried upon the frame $a$.

I claim:—

1. An apparatus for lowering mail bags and other loads from air craft, comprising a frame to which the load is attached, a main parachute and a pilot parachute carried by said frame, means whereby said pilot parachute is released upon launching of the apparatus from the air craft, a suspending cable connected with said pilot parachute, a releasing cord connected with said suspending cable and with said main parachute, means for releasably connecting said suspending cable with the frame, said means comprising a pair of pivotally mounted jaws adapted to engage a loop in said cable, separate locking means for each of said jaws, the releasing of either of said locking means causing the release of said suspending cable, and the consequent release of said main parachute, a projectile movable by an explosive charge to release the locking means of one of said jaws, electric ignition means for said explosive charge and means for closing the circuit of said electric ignition means when the frame and load has reached a predetermined distance above the ground thereby releasing said jaw locking means and permitting the disengagement of the suspending cable from said jaw, and causing the pilot parachute to release the main parachute.

2. An apparatus for lowering mail bags and other loads from air craft, comprising a frame to which the load is attached, a main parachute and a pilot parachute carried by said frame, means whereby said pilot parachute is released upon launching of the apparatus from the air craft, a suspending cable connected with said pilot parachute, a releasing cord connected with said suspending cable and with said main parachute, means for releasably connecting said suspending cable with the frame, said means comprising a pair of pivotally mounted jaws, adapted to engage a loop in said cable, separate locking means for each of said jaws, the releasing of either of said locking means causing the release of said suspending cable, and the consequent release of said main parachute, a projectile movable by an explosive charge to release the locking means of one of said jaws, a pilot weight, a combined suspending and electric current conducting cable connected with said weight and with said frame whereby the weight is suspended at a suitable distance below the frame, a switch arranged in said weight and in electrical connection with said cable, said switch being adapted to be closed by contact of the weight with the ground, electric ignition means for said explosive charge, said ignition means being in the circuit of said current conducting cable, whereby upon closing of the switch in said weight, said explosive charge is ignited.

3. An apparatus for lowering mail bags and other loads from air-craft comprising a frame to which the load is attached, a main parachute and a pilot parachute connected with said frame, means whereby said pilot parachute is released upon launching the apparatus from the air-craft, a suspending cable connected with said pilot parachute, a releasing cord connected with said suspending cable and said main parachute, means for releasably connecting said suspending cable with the frame, said means comprising a pair of pivotally mounted jaws adapted to engage a loop in said suspending cable, a locking pin engaged with one of said jaws for holding the same in operative position, a releasing cord connected with said pin and with the air-craft whereby the same is removed upon launching of the apparatus and said jaw permitted to release said suspending cable, thereby causing the pilot parachute to immediately release the main parachute, for low altitude delivery, and independent locking means for said other jaw to be automatically operated to release said suspending cable and the main parachute when the apparatus has reached a predetermined distance from the ground as when delivering from high altitudes.

4. An apparatus for lowering mail bags and other loads from air-craft, comprising a frame to which the load is attached, a main parachute and a pilot parachute carried by said frame, means whereby said pilot parachute is released upon launching of the apparatus from the air-craft, a suspending cable connected with said pilot parachute, a releasing cord connected with said suspending cable and with said main parachute, means for releasably connecting said suspending cable with the frame, said means comprising a pair of pivotally mounted jaws, adapted to engage a loop in said cable, separate locking means for each of said jaws, the releasing of either of said locking means causing the release of said suspending cable, and the consequent release of said main parachute, a projectile movable by an explosive charge to release the locking means of one of said jaws, means for igniting said charge and thereby releasing the locking means of said jaw when the apparatus has reached a predetermined distance from the ground, said means comprising an electric circuit including a drum revolvably mounted in the frame, a combined suspension and electric conducting cable wound on said drum, a pilot weight attached to the free end of said cable, a switch arranged in said weight and in the circuit of said cable, means connected with said weight for closing the switch when the weight strikes the ground thereby igniting said explosive charge, a braking mechanism for said drum actuated by the unwinding of the cable therefrom, a second normally open switch in said ignition circuit and means whereby said second switch is closed by said braking mechanism when the latter is in full operative position.

5. An apparatus for lowering mail bags and other loads from air-craft, comprising a frame to which the load is attached, a main parachute and a pilot parachute connected with said frame, a frame suspending cable connected with said pilot parachute, a pair of jaws pivotally mounted on said frame, a loop in the end of said cable and adapted to be engaged with said jaws whereby said frame and load is connected to said pilot parachute for rapid lowering movement, a locking pin for holding one of said jaws in engagement with said cable loop, a spring catch for holding said other jaw in engagement with said cable loop, a releasing cord for said locking pin, a winding drum revolvably mounted in said frame, a pilot weight, a weight suspending cable connected to said weight and wound on said drum, releasing means for said spring catch, means carried by said pilot weight for actuating said catch releasing means when the apparatus has reached a predetermined distance from the ground, a locking pin for holding said drum against rotation and adapted to be removed before launching of the apparatus, a second locking pin for holding said drum against rotation, a releasing cord attached to said second pin, and means carried by the air-craft with which the free ends of the releasing cords of said jaw locking pin and said drum locking pin are connected and whereby either of said cords may be released and the other retained when the apparatus is launched.

6. An apparatus for lowering mail bags and other loads from air-craft comprising a frame to which the load is attached, a main parachute and a pilot parachute connected with said frame, said pilot parachute being releasable upon the launching of the apparatus from the air craft, a drum revolvably mounted in said frame, a pilot weight suspension cable wound on said drum, a pilot weight connected to the free end of said cable and adapted to be lowered by the unwinding of said cable from said drum, a worm on the shaft of said drum, a threaded rod slidably mounted in said frame, a worm gear engaged with said worm and having a nut engaging the threads on said rod, whereby the rod is shifted longitudinally by the revolving of the drum, a pair of brake shoes adapted to engage the inner surface of said drum and operating levers connected with said shoes and with said threaded rod whereby the shifting of the rod actuates the levers and thereby applies the brake shoes to the drum.

7. In an apparatus for lowering mail bags and other loads from air-craft, a frame, a main parachute and a pilot parachute, a suspending cable connected with said pilot parachute, releasable means for connecting the free end of said cable with said frame, a releasing cord connected with said suspending cable and with said main parachute whereby the latter is pulled to an operative position upon release of the suspending cable of said pilot parachute from said frame, a spring projected bolt mounted on said frame, a bolt retracting lever also pivotally mounted on said frame and having one end operatively engaged with said bolt, a main suspending cable connected at one end with said main parachute and at its other end with said bolt retracting lever, a relatively short load suspending rope having one end connected with the load and having in its other end a loop engaged with said bolt whereby the load is held close to the frame during the greater part of the descent of the apparatus, said bolt being retracted by said lever and main suspending cable when said main parachute is brought to an operative position, the retraction of said bolt releasing said short load suspending rope and a second relatively long load suspending rope whereby the load is suspended from the frame when said short rope is released.

8. In an apparatus for lowering mail bags and other loads from air craft, a frame, a casing on one end of said frame, a controlling mechanism housed in said casing, a parachute container on the opposite end of said frame, a main parachute removably arranged in said container, a main suspending cable connecting said main parachute with said frame, a pilot parachute in said container, a suspending cable connected with said pilot parachute and having a releasable connection with said frame, a releasing cord connecting said main parachute with the suspending cable of said pilot parachute, whereby said main parachute is pulled from said container and to an operative position by said pilot parachute when the suspending cable of the latter is released from its connection with said frame, a cover for said parachute container, a relatively strong line connecting said cover with the air-craft whereby when the apparatus is launched said cover is pulled from the container, a breakable line connecting said cover with said pilot parachute whereby the latter is drawn from said container to an operative position by the removal of said cover, said last named line being broken by the pull of the apparatus after said pilot parachute has been drawn thereby to its operative position.

In testimony whereof he has affixed his signature.

HAROLD EDWARD SHERWIN HOLT.